March 12, 1963 E. SALLER ET AL 3,081,359
PRODUCTION OF CARBON TETRACHLORIDE FROM CARBON BISULFIDE
Filed July 29, 1959
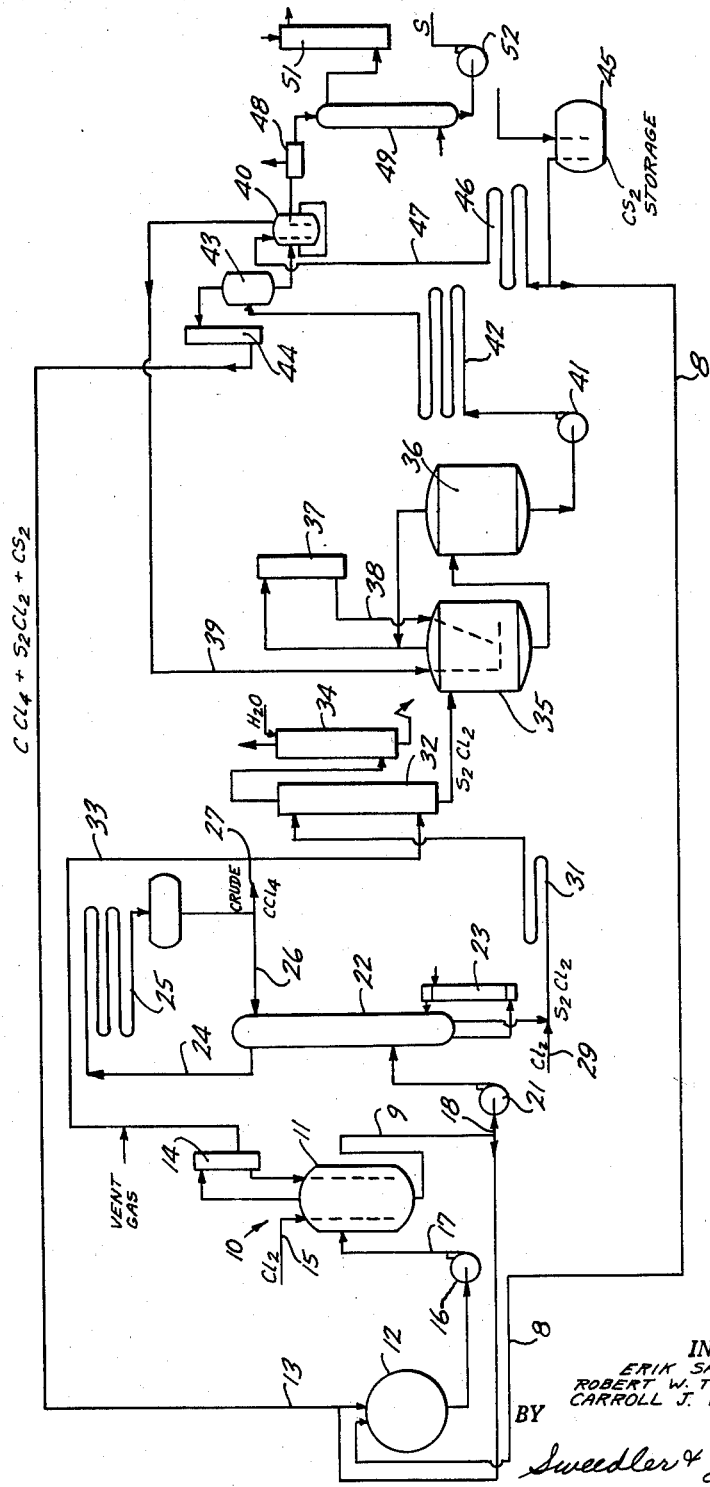
INVENTORS
ERIK SALLER
ROBERT W. TIMMERMAN
CARROLL J. WENZKE
BY
Sweedler & Zucker
ATTORNEYS

United States Patent Office 3,081,359
Patented Mar. 12, 1963

3,081,359
PRODUCTION OF CARBON TETRACHLORIDE FROM CARBON BISULFIDE
Erik Salier, Tonawanda, N.Y., Robert Timmerman, Charleston, W. Va., and Carroll J. Wenzke, Peekskill, N.Y., assignors to FMC Corporation, a corporation of Delaware
Filed July 29, 1959, Ser. No. 830,410
9 Claims. (Cl. 260—664)

This invention relates to the production of carbon tetrachloride from carbon bisulfide.

In this specification all percentages and parts are on a weight basis.

In the chlorination of carbon bisulfide the following exothermic reaction takes place:

(1) $\quad 2CS_2 + 6Cl_2 \rightarrow 2CCl_4 + 2S_2Cl_2$

This reaction goes to completion; however, for the economical production of carbon tertchloride the sulfur monochloride must be utilized. The sulfur monochloride can be reacted with fresh carbon bisulfide in accordance with the following equation:

(2) $\quad 2S_2Cl_2 + CS_2 \rightleftharpoons CCl_4 + 3S_2$

This reaction is exothermic and proceeds to an equilibrium of about 75% completion.

Many procedures have been suggested to combine these reactions and minimize the difficulty of separating the carbon tetrachloride from the sulfur monochloride and sulfur formed. All such procedures heretofore proposed have been found objectionable for a number of reasons, among the more important of which may be mentioned: (1) they involve the recycle of relatively large amounts of sulfur monochloride; (2) they involve the recycle of elemental sulfur through the chlorination stage; and (3) they involve utilization of reaction conditions requiring relatively long periods of time to go to substantial completion, with consequent long hold-up times.

It is among the objects of the present invention to provide a process of producing carbon tetrachloride from carbon bisulfide which involves relatively short hold-up times, does not involve the recycle of elemental sulfur through the chlorination stage, and involves the recycle of relatively small amounts of sulfur monochloride.

Another object of this invention is to provide such process which is continuous, or continuous for all practical purposes.

Other objects and advantages of this invention will be apparent from the following detailed description thereof.

In accordance with this invention, carbon tetrachloride is produced by reacting a mixture of carbon bisulfide, carbon tetrachloride and sulfur monochloride, produced in a subsequent step of the process, with chlorine to form a reaction mixture containing as its essential constituents carbon tetrachloride and sulfur monochloride; this reaction mixture is distilled to separate the carbon tetrachloride overhead from the sulfur monochloride; the sulfur monochloride, thus separated from the carbon tetrachloride, is reacted with carbon bisulfide to produce a reaction mixture containing carbon bisulfide, carbon tetrachloride, sulfur monochloride and sulfur; the reaction mixture thus produced is heated to a temperature below the boiling point of sulfur but above the boiling point of sulfur monochloride, to drive off overhead carbon bisulfide, sulfur monochloride and carbon tetrachloride, and thus effect a separation of these constituents from the elemental sulfur; and the mixture of carbon bisulfide, sulfur monochloride and carbon tetrachloride thus separated from the sulfur is introduced into the first step above mentioned. The sulfur thus separated, if desired, may be employed in accordance with any conventional procedure to produce additional carbon bisulfide which is utilized in the process hereinabove described.

The process is carried out continuously. The chlorination, which may be effected in a single stage or in multiple stages at a temperature of from 50°–105° C., is conducted to produce at the exit end of the chlorination zone a mixture of carbon tetrachloride and sulfur monochloride containing some but not exceeding 0.1% carbon bisulfide. By observing this precaution of leaving a small amount of carbon bisulfide in the reaction mixture and operating under the recited temperature conditions, and with no excess of chlorine, the presence of sulfur dichloride in the reaction mixture introduced into the still where separation of the carbon tetrachloride and sulfur monochloride is effected, is minimized. The amount of chlorine used is the stoichiometric amount or slightly more (say, about 1% or less) than that required to react with all of the carbon bisulfide present to produce carbon tetrachloride. The mixture fed to the chlorinator, containing from 10% to 35%, preferably 10% to 25% of carbon bisulfide, from 25% to 45%, preferably 35% to 45% carbon tetrachloride, and from 25% to 45%, preferably 35% to 45% sulfur monochloride is stored under a blanket of inert gas such as nitrogen because it is flammable.

From the chlorinator, the reaction mixture, containing as its two principal components, carbon tetrachloride and sulfur monochloride, is separated continuously by fractional distillation in a column still preferably operating under atmospheric pressure conditions. This distillation is carried out to minimize the amount of sulfur monochloride which goes overhead with the carbon tetrachloride and so that a controlled amount, preferably from 3% to 7%, of carbon tetrachloride is present in the bottoms. Such amount of carbon tetrachloride in the bottoms tends to retard decomposition of sulfur monochloride into chlorine and sulfur during the distillation. By employing a column having the necessary number of theoretical plates and with return of a portion of the condensate as reflux, such separation can readily be effected.

The bottoms, consisting of sulfur monochloride containing a small amount of carbon tetrachloride as above disclosed, may be refrigerated to about −6° C. and used to scrub the vent gas from the chlorination. The resultant mixture is introduced into a reactor (hereinafter sometimes referred to as a mixer) where it reacts with carbon bisulfide. The carbon bisulfide introduced into the mixer desirably is produced by vaporizing the incoming carbon bisulfide and superheating the vapors to about 200° to 240° C. The superheated vapors are passed through the elemental sulfur produced in a subsequent stage of the process to remove from the sulfur, sulfur monochloride, carbon tetrachloride and carbon bisulfide. The resultant vapor stream is then introduced into the mixer for admixture with the sulfur monochloride.

Preferably there is admixed with the bottoms from the still, before it enters into the mixer, a small amount of chlorine. Desirably, the amount of chlorine thus mixed with the bottoms is enough to react with the sulfur monochloride present to form from 1% to 5% sulfur dichloride in the bottoms stream entering the mixer. This small amount of sulfur dichloride appears to catalyze the Reaction 2 above.

The proportions of carbon bisulfide and sulfur monochloride thus continuously supplied to the mixer are controlled to feed about 0.5 mol of carbon bisulfide per mol of sulfur monochloride to the mixer, desirably from 0.5 to 1 mol of carbon bisulfide per mol of sulfur monochloride. By so doing and by observing the other conditions herein disclosed, the amount of sulfur monochloride left in the reaction mixture is kept at a minimum with consequent recycle of relatively small amounts of sulfur monochloride.

The mixer operates under reflux conditions. Preferably a further catalyst is supplied, such as iron, which may be from the walls of the vessel in which the reaction is carried out. The preferred further catalyst is ferric chloride added in amount of from 15 p.p.m. to 2–3% by weight of the charge introduced into the mixer. Under these conditions and with the ratio of sulfur monochloride to carbon bisulfide hereinabove disclosed, the reaction requires only a few hours to reach equilibrium. Hence, the process can be carried out continuously with short hold-up times.

From the mixer the reaction mixture thus produced is heated to a temperature of about 200° C. and pumped to a flash tank. In this heater and flash tank a certain amount of the carbon tetrachloride present reacts with sulfur to form carbon bisulfide and sulfur monochloride, i.e. some reversion of carbon tetrachloride takes place, which reversion is unavoidable.

The vapors thus flashed off, and consisting of a mixture containing from about 10% to 20% carbon bisulfide, from 30% to 45% carbon tetrachloride and from 35% to 55% sulfur monochloride, pass into a condenser; the condensate flows to the chlorination treatment. The molten sulfur, containing from 5% to 20% sulfur monochloride and still smaller amounts of carbon tetrachloride and carbon bisulfide passes from the flash tank into a stripper where, as above described, it is contacted with carbon bisulfide vapors, thus recovering sulfur monochloride and carbon bisulfide in the sulfur. The residual sulfur is purified, for example, by steam stripping or, alternatively, by washing the molten sulfur at a temperature within the range of 120° to 160° C. with a dilute caustic solution or water under a pressure of about 3 atmospheres, permitting the reaction mixture to stratify into two layers, one, an upper aqueous layer containing dissolved chlorides and sulfites, and the other, the lower pure molten sulfur layer, and withdrawing the thus purified sulfur; the latter can be converted, if desired, to carbon bisulfide by conventional techniques, or otherwise utilized.

The accompanying drawing is a flow sheet showing one preferred arrangement of equipment for practicing the process of this invention.

In this drawing, 10 indicates the chlorination stage or step involving a chlorinator 11 which communicates with tank 12 for receiving the mixture of carbon bisulfide, carbon tetrachloride and sulfur monochloride. In the embodiment of the invention shown in the drawing a single stage chlorinator is disclosed in which chlorine is introduced into the chlorinator 11 through line 15, and vapors generated are condensed in condenser 14 and the condensate fed to the chlorinator 11. The chlorination reaction mixture is recycled through chlorinator 11, flowing through line 9, feed tank 12, pump 16 and back to the chlorinator through line 17. Feed tank 12 is continuously supplied with the mixture of carbon bisulfide, carbon tetrachloride and sulfur monochloride through line 13 leading from the flash still condenser 44, hereinafter described. Preferably a portion of the carbon bisulfide is introduced into tank 12 directly from storage tank 45 through line 8.

Instead of a single stage chlorination, multiple stage chlorination may be employed, as disclosed in application Serial No. 833,573 filed August 13, 1959.

Chlorination is carried out so as to produce a chlorinated reaction mixture containing as the principal components, carbon tetrachloride and sulfur monochloride, and from 0.03% to 0.10% carbon bisulfide. In the embodiment shown in the drawing, a portion of the recycle stream is withdrawn continuously through discharge line 18; this stream contains carbon tetrachloride, sulfur monochloride and a small amount of carbon bisulfide.

This reaction mixture is pumped continuously by pump 21 into a column still 22 provided with a reboiler 23. Carbon tetrachloride is taken off overhead through line 24, condensed in condenser 25, a portion of the condensate is returned as reflux liquid through line 26, and the remainder removed through line 27 as crude carbon tetrachloride product. This crude carbon tetrachloride may be purified in any known manner or by the procedure disclosed in co-pending application Serial No. 820,-363 filed June 15, 1959, now Patent No. 2,945,796.

Chlorine may be supplied through line 29 for admixture with the bottoms to react with sulfur monochloride therein to form a small amount of sulfur dichloride, which as above noted catalyzes the reaction between carbon bisulfide and sulfur monochloride to form carbon tetrachloride and sulfur.

The bottoms from column 22, if desired, may be refrigerated to a temperature of about −6° C. in a refrigerator 31 communicating with an absorber 32 through which passes the vent gas (non-condensible gases produced in the chlorinator) from the chlorinator 11. This vent gas is introduced into the absorber 32 through line 33 at the base of the absorber. It then passes from the absorber 32 to a scrubber 34 where the gas is scrubbed with water to remove noxious fumes which may be present. By so doing, losses of valuable constituents in the vent gases are minimized.

Sulfur monochloride from the absorber 32, containing carbon bisulfide, a small amount of sulfur dichloride formed by reaction of the small amount of added chlorine with the sulfur monochloride, and a small amount of carbon tetrachloride removed from the vent gas, passes to the first of a pair of mixers 35, 36. These mixers operate under reflux conditions and for this purpose communicate with a condenser 37 which condenses evolved vapors from both mixers. The condensate flows through line 38 to mixer 35.

Carbon bisulfide vapor from the sulfur stripper 40 is introduced continuously into the mixer 35 through line 39. Liquid flows from the mixer 35 to mixer 36. Mixers 35 and 36 are dimensioned and the flow rates to and discharge from these mixers are such as to provide a hold-up time in these mixers of about 1 to 8 hours.

From mixer 36 the reaction mixture is pumped continuously by pump 41 through a heater 42 into a flash tank 43. In heater 42 the mixture is heated to from about 180° to about 275° C. preferably from about 200° to 240° C. This heating operation vaporizes, of the total fed, about 97% of the carbon bisulfide, about 96% of the carbon tetrachloride and about 85% of the sulfur monochloride. The vapors leave the flash tank 43, pass through the condenser 44, and the resultant condensate is passed continuously to the chlorinator feed tank 12 through line 13.

Liquid elemental sulfur, containing a small amount of sulfur chloride (about 7%) and still smaller amounts of carbon tetrachloride and carbon bisulfide, passes from flash tank 43 to the sulfur stripper 40. Carbon bisulfide from storage tank 45 passes through a vaporizer 46; the resultant vapors flow through line 47 into and through the sulfur in stripper 40, removing from the elemental sulfur, sulfur monochloride, carbon tetrachloride and carbon bisulfide. As above described, the resultant stream flows into the mixer 35 through line 39.

The elemental sulfur from stripper 40 may be purified in any desired manner. For example, it may be passed through cooler 48 and thence to steam stripped 48 communicating with condenser 51. The purified sulfur is pumped from the stripper 49 by pump 52 to the carbon bisulfide plant or other suitable place of utilization. Alternatively, the sulfur may be purified by treatment with alkali or water as disclosed above.

The following examples are given for illustrative purposes only; it will be appreciated that this invention is not limited to these examples which illustrate preferred modes of practicing the invention. In the examples all poundage values are pounds per hour; temperatures in degrees C.

The examples are carried out in equipment of the general type shown in the drawing, under atmospheric pressure conditions.

Example I

In this example all of the carbon bisulfide feed is introduced into the stripper 40.

Chlorination is effected by continuously introducing into the chlorinator 7,336 pounds of chlorine and 9,180 pounds of a mixture containing 28.6% carbon bisulfide, 26.3% carbon tetrachloride and 45.1% sulfur monochloride, which mixture flows from the flash still condenser 44. The chlorine and carbon bisulfide enter at atmospheric temperature (about 25° C.) and the said mixture at a temperature of 40° C. The temperature at the exit end of the chlorinator is 105° C.

16,516 pounds of chlorinated material is pumped from the chlorinator into still 22 operated at a bottoms temperature of about 135° C. and at a temperature of 78° C. at its top. This material introduced into still 22 contains 0.05% carbon bisulfide, 46.65% carbon tetrachloride, 53% sulfur monochloride and 0.3% sulfur dichloride. The overhead stream from still 22 in amount of 8,476 pounds contains 0.1% carbon bisulfide, 98.9% carbon tetrachloride, 0.4% sulfur monochloride and 0.6% sulfur dichloride. The bottoms stream from this still in amount of 8,040 pounds contains 4.5% carbon tetrachloride and 95.5% sulfur monochloride. This stream is mixed with 116 pounds of chlorine. A reaction takes place between the chlorine and the sulfur monochloride. There is thus produced a stream in amount of 8,156 pounds containing 4.4% carbon tetrachloride, 91.5% sulfur monochloride and 4.1% sulfur dichloride which is introduced into the mixer 35 at a temperature of about 100° C. Also introduced into the mixer is a stream from the sulfur stripper 40 in amount of 3,848 pounds consisting of 95.8% carbon bisulfide and 4.2% sulfur monochloride; the temperature of the latter stream is 220° C. The mixer 35 is maintained under reflux conditions.

There is removed from the mixer a stream in amount of 12,000 pounds consisting of 22.1% carbon bisulfide, 20.4% carbon tetrachloride, 36.6% sulfur monochloride and 20.9% sulfur. This stream is heated to 200° C. and the heated material is introduced into the flash tank 43. There is taken overhead from this flash tank a stream in amount of 9,180 pounds consisting of 28.6% carbon bisulfide, 26.3% carbon tetrachloride and 45.1% sulfur monochloride which is condensed and the condensate introduced into the chlorinator as hereinabove described.

There is removed as bottoms from the flash tank 43 a stream in amount of 2,820 pounds consisting of 0.8% carbon bisulfide, 1.4% carbon tetrachloride, 8.8% sulfur monochloride and 89% sulfur. This stream is introduced into the sulfur stripper 40 where it is stripped with 3,668 pounds of carbon bisulfide vapor producing the overhead stream in amount of 3,848 pounds containing 95.8% carbon bisulfide and 4.2% sulfur monochloride introduced into the mixer 35. There is removed as bottoms from the sulfur stripper 2,636 pounds consisting of 0.2% carbon bisulfide, 1.5% carbon tetrachloride, 3.2% sulfur monochloride and 95.1% sulfur.

Example II

In this example a portion of the carbon bisulfide feed is supplied to the stripper 40 and the remainder to the chlorinator.

Chlorination is effected by continuously introducing into the chlorinator 9,379 pounds of chlorine and 11,450 pounds of a mixture containing 29.4% carbon bisulfide, 36.6% carbon tetrachloride, 33.5% sulfur monochloride and 0.5% sulfur dichloride, which mixture flows from the flash still condenser 44 and contains, in addition to the mixture from the condenser 44, 2,329 pounds of carbon bisulfide feed. The chlorine and carbon bisulfide enter at atmospheric temperature (about 25° C.) and the said mixture at a temperature of 40° C. The temperature at the exit end of the chlorinator is 105° C.

20,829 pounds of chlorinated material is pumped from the chlorinator into still 22 operated at a bottoms temperature of about 136° C. and at a temperature of 78° C. at its top. The chlorinated material introduced into still 22 contains 0.05% carbon bisulfide, 52.6% carbon tetrachloride, 47.06% sulfur monochloride and 0.29% sulfur dichloride. The overhead stream from still 22 in amount of 10,228 pounds contains 0.1% carbon bisulfide, 98.9% carbon tetrachloride, 0.4% sulfur monochloride and 0.6% sulfur dichloride. The bottoms stream from this still in amount of 10,601 pounds contains 92% sulfur monochloride and 8% carbon tetrachloride. 148 pounds of chlorine is added to this stream. The chlorine reacts with the sulfur monochloride producing a mixture in amount of 10,749 pounds containing 7.9% carbon tetrachloride, 88.1% sulfur monochloride and 4% sulfur dichloride which is introduced into the mixer 35 at a temperature of about 100° C. Also introduced into this mixer is a stream from the sulfur stripper 40 in amount of 3,154 pounds consisting of 87.2% carbon bisulfide, 1.5% carbon tetrachloride and 11.3% sulfur monochloride; the temperature of the latter stream is 220° C. The mixer 35 is maintained under reflux conditions.

There is removed from the mixer a stream in amount of 13,903 pounds consisting of 7.6% carbon bisulfide, 31.1% carbon tetrachloride, 30.86% sulfur monochloride, 0.44% sulfur dichloride and 30% sulfur. This stream is heated to 190° C. and the heated material is introduced into the flash tank 43. There is taken overhead from this flash tank a stream in amount of 9,121 pounds consisting of 11.4% carbon bisulfide, 45.9% carbon tetrachloride, 42.1% sulfur monochloride and 0.6% sulfur dichloride which is condensed and the condensate introduced into the chlorinator as hereinabove described.

There is removed as bottoms from the flash tank 43 a stream in amount of 4,782 pounds consisting of 0.3% carbon bisulfide, 2.9% carbon tetrachloride, 9.6% sulfur monochloride and 87.2% sulfur. This stream is introduced into the sulfur stripper 40 where it is stripped with 2,737 pounds of carbon bisulfide vapor producing the overhead stream in amount of 3,154 pounds consisting of 87.2% carbon bisulfide, 1.5% carbon tetrachloride and 11.3% sulfur monochloride introduced into the mixer 35. There is removed as bottoms from the sulfur stripper 4,365 pounds consisting of 0.135% carbon bisulfide, 2.04% carbon tetrachloride, 2.34% sulfur monochloride and 95.485% sulfur.

Example III

In this example, as in Example II, a portion of the carbon bisulfide feed is supplied to the stripper 40 and the remainder to the chlorinator.

Chlorination is effected by continuously introducing into the chlorinator 10,190 pounds of chlorine and 11,622 pounds of a mixture containing 30.8% carbon bisulfide, 36.4% carbon tetrachloride, 30.6% sulfur monochloride and 2.2% sulfur dichloride, which mixture flows from the flash still condenser 44 and contains, in addition to the mixture from the condenser 44, 2,449 pounds of carbon bisulfide feed. The chlorine and carbon bisulfide enter at atmospheric temperature (about 25° C.) and the said mixture at a temperature of 40° C. The temperature at the exit end of the chlorinator is 100° C.

21,812 pounds of chlorinated material is pumped from the chlorinator into still 22 operated at a bottoms temperature of about 136° C. and at a temperature of 78° C. at its top. The chlorinated material introduced into still 22 contains 0.04% carbon bisulfide, 54.16% carbon tetrachloride, 45.5% sulfur monochloride and 0.3% sulfur dichloride. The overhead stream from still 22 in amount of 11,188 pounds contains 0.08% carbon bisulfide, 98.92% carbon tetrachloride, 0.4% sulfur monochloride and 0.6% sulfur dichloride. The bottoms stream from this still in amount of 10,624 pounds contains 6.9% carbon tetrachloride and 93.1% sulfur monochloride. 165 pounds of chlorine is added to this stream. The chlorine reacts with the sulfur monochloride producing a mixture in amount of 10,789 pounds containing 6.8% carbon tetrachloride, 88.4% sulfur monochloride and 4.8% sulfur dichloride which is introduced into the mixer 35 at a temperature of about 100° C. Also introduced into this mixer is a stream from the sulfur stripper 40 in amount of 3,408 pounds consisting of 85.3% carbon bisulfide, 2.6% carbon tetrachloride, 10.6% sulfur monochloride and 1.5% sulfur; the temperature of the latter stream is 220° C. The mixer 35 is maintained under reflux conditions.

There is removed from the mixer a stream in amount of 14,197 pounds consisting of 5.9% carbon bisulfide, 35.2% carbon tetrachloride, 20.5% sulfur monochloride, 1.8% sulfur dichloride and 36.6% sulfur. This stream is heated to 200° C. and the heated material is introduced into the flash tank 43. There is taken overhead from this flash tank a stream in amount of 9,173 pounds consisting of 12.3% carbon bisulfide, 46.2% carbon tetrachloride, 38.7% sulfur monochloride and 2.8% sulfur dichloride which is condensed and the condensate introduced into the chlorinator as hereinabove described.

There is removed as bottoms from the flash tank 43 a stream in amount of 5,024 pounds consisting of 0.4% carbon bisulfide, 2.8% carbon tetrachloride, 9.0% sulfur monochloride and 87.8% sulfur. This stream is introduced into the sulfur stripper 40 where it is stripped with 100 pounds of carbon bisulfide vapor producing the overhead stream in amount of 3,408 pounds consisting of 85.3% carbon bisulfide, 2.6% carbon tetrachloride, 10.6% sulfur monochloride and 1.5% sulfur introduced into the mixer 35. There is removed as bottoms from the sulfur stripper 4,505 pounds consisting of 0.1% carbon bisulfide, 1.1% carbon tetrachloride, 2% sulfur monochloride and 96.8% sulfur.

It will be noted that the present invention provides a continuous process of producing carbon tetrachloride from carbon bisulfide involving relatively short hold-up times, the recycle of relatively small amounts of sulfur monochloride, and the substantially complete utilization of the carbon bisulfide introduced into the process and sulfur monochloride formed in the process, in the production of carbon tetrachloride. Moreover, the present invention does not involve the recycle of elemental sulfur through the chlorination stages but its removal from the process as formed; the sulfur thus removed can be converted to carbon bisulfide for use in the process.

Since different embodiments of the invention could be made without departing from the scope of this invention, it is intended that all matter contained in the above description or shown in the accompanying drawing shall be interpreted as illustrative and not in a limiting sense.

What is claimed is:

1. The continuous process of producing carbon tetrachloride from carbon bisulfide which comprises the following steps: step 1, continuously flowing a mixture of carbon bisulfide, carbon tetrachloride, sulfur monochloride and chlorine through a chlorination zone at a temperature of from 50° C. to 105° C., and removing from the exit end of said chlorination zone a reaction mixture of carbon tetrachloride and sulfur monochloride containing from 0.03% to 0.10% carbon bisulfide; step 2, continuously distilling the reaction mixture thus withdrawn from step 1 to take off overhead the carbon tetrachloride and remove as bottoms the sulfur monochloride; step 3, continuously mixing the sulfur monochloride thus removed from step 2 with a stream of carbon bisulfide and reacting the resultant mixture to produce a reaction mixture containing carbon bisulfide, carbon tetrachloride, sulfur monochloride and sulfur; step 4, continuously heating the reaction mixture from step 3 to a temperature above the boiling point of sulfur monochloride, but below the boiling point of sulfur and introducing the heated reaction mixture into a flashing zone to flash off and thus separate a vapor mixture consisting essentially of carbon bisulfide, carbon tetrachloride and sulfur monochloride from the sulfur; step 5, continuously introducing said mixture from step 4 into step 1 of the process and continuously withdrawing the sulfur produced in step 4 from step 4.

2. The continuous process as defined in claim 1, in which the carbon bisulfide and sulfur monochloride are mixed in a mol ratio of from about 0.5 to about 1 carbon bisulfide per mol of sulfur monochloride.

3. The continuous process as defined in claim 1, in which the sulfur removed from step 4 is stripped with carbon bisulfide vapor to remove from the sulfur, sulfur monochloride and carbon tetrachloride, and the resultant carbon bisulfide vapor stream containing the extracted sulfur monochloride and carbon tetrachloride is introduced into step 3 for reaction with the sulfur monochloride.

4. The continuous process as defined in claim 1, in which the vent gases from step 1 are scrubbed with the sulfur monochloride removed from step 2 and the resulting sulfur monochloride mixture is reacted with the carbon bisulfide in step 3.

5. The continuous process as defined in claim 1, in which the sulfur monochloride removed from step 2 is reacted with the carbon bisulfide in the presence of an iron catalyst to produce the reaction mixture containing carbon bisulfide, carbon tetrachloride, sulfur monochloride and sulfur.

6. The continuous process as defined in claim 1, in which the reaction mixture from step 3 is heated to a temperature within the range of about 180° to 275° C. and the thus heated reaction mixture is introduced into a flash tank to distill off the mixture of carbon bisulfide, carbon tetrachloride and sulfur monochloride.

7. The continuous process as defined in claim 1, in which a small amount of chlorine is added to the sulfur monochloride removed from step 2 to react with the sulfur monochloride and form sulfur dichloride, and the resultant mixture is reacted with carbon bisulfide to produce the reaction mixture containing carbon bisulfide, carbon tetrachloride, sulfur monochloride and sulfur.

8. The continuous process as defined in claim 7, in which the amount of chlorine added to the sulfur monochloride removed from step 2 is such as to produce from 1% to 5% by weight of sulfur dichloride in the mixture admixed with the carbon bisulfide for reaction therewith.

9. The continuous process of producing carbon tetrachloride from carbon bisulfide which comprises the following steps: step 1, continuously flowing a mixture containing from 10% to 35% carbon bisulfide, from 25% to 45% carbon tetrachloride, from 25% to 45% sulfur monochloride and about the stoichiometric amount of chlorine required to react with the carbon bisulfide to produce carbon tetrachloride through a chlorination zone at a temperature of from 50° to 105° C., and removing from the exit end of said chlorination zone a reaction mixture of carbon tetrachloride and sulfur monochloride containing small amounts of carbon bisulfide; step 2, continuously distilling the reaction mixture thus removed from step 1 to take off overhead the carbon tetrachloride and remove as bottoms the sulfur monochloride; step 3, continuously mixing the sulfur monochloride thus removed from step 2 with a stream of carbon bisulfide in amounts ranging from 0.5 to 1 mol of carbon bisulfide per mol of sulfur monochloride and reacting said mixture to produce a reaction mixture containing carbon bisulfide, carbon tetrachloride, sulfur monochloride and sulfur; step 4, continuously heating the reaction mixture from step 3 to from 180° to 275° C. and introducing the heated reaction mixture into a flashing zone to flash off and thus separate a vapor mixture consisting essentially of from 10% to 20% carbon bisulfide, from 30% to 45% carbon tetrachloride and from 35% to 55% sulfur monochloride from the sulfur residue; step 5, continuously condensing said vapor mixture from step 4, mixing same with chlorine and carbon bisulfide and introducing the resultant admixture into step 1 of the process.

References Cited in the file of this patent

UNITED STATES PATENTS

| | | |
|---|---|---|
| 992,551 | Doerflinger | May 16, 1911 |
| 1,260,622 | Baillio | Mar. 26, 1918 |
| 1,817,123 | Brallier et al. | Aug. 4, 1931 |
| 2,016,804 | Nichols | Oct. 8, 1935 |
| 2,110,174 | Reilly | Mar. 8, 1938 |
| 2,316,736 | Beanblossom et al. | Apr. 13, 1943 |
| 2,316,737 | Beanblossom et al. | Apr. 13, 1943 |